(12) United States Patent
Heise et al.

(10) Patent No.: US 8,945,749 B2
(45) Date of Patent: Feb. 3, 2015

(54) CARBON FIBER THERMAL INTERFACE FOR COOLING MODULE ASSEMBLY

(75) Inventors: Axel Heise, Mainz (DE); Alastair Gordon Anderson, Wiesbaden (DE); Stefan Toepfer, Mainz-Kostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 13/327,001

(22) Filed: Dec. 15, 2011

(65) Prior Publication Data
US 2013/0157100 A1 Jun. 20, 2013

(51) Int. Cl.
*H01M 10/50* (2006.01)
*H01M 10/647* (2014.01)
*H01M 10/6551* (2014.01)
*H01M 10/6554* (2014.01)
*B60K 1/04* (2006.01)

(52) U.S. Cl.
CPC ...... *H01M 10/5032* (2013.01); *H01M 10/5046* (2013.01); *H01M 10/5053* (2013.01); *B60K 1/04* (2013.01)
USPC ........................................ 429/120

(58) Field of Classification Search
CPC ............ H01M 10/50; H01M 10/5004; H01M 10/5053; H01M 10/504; H01M 10/5032; H01M 10/5016; H01M 10/0525; H01M 6/5038; F28F 3/02; F28F 3/06; F28F 21/02; Y02E 60/12; B60K 1/04
USPC .............................. 429/120, 62; 165/132, 138
See application file for complete search history.

(56) References Cited

U.S. PATENT DOCUMENTS

| | | | |
|---|---|---|---|
| 2002/0053421 A1 * | 5/2002 | Hisano et al. | 165/104.33 |
| 2008/0315401 A1 * | 12/2008 | Imamura et al. | 257/712 |
| 2011/0212355 A1 | 9/2011 | Essinger et al. | |
| 2012/0021270 A1 | 1/2012 | Kumar et al. | |
| 2013/0071717 A1 * | 3/2013 | Muniz | 429/120 |

FOREIGN PATENT DOCUMENTS

| | | | | |
|---|---|---|---|---|
| CN | 1513068 A | | 7/2004 | |
| WO | WO 2009/052814 | * | 4/2009 | H01L 23/473 |

* cited by examiner

*Primary Examiner* — Raymond Alejandro
(74) *Attorney, Agent, or Firm* — Fraser Clemens Martin & Miller LLC; James D. Miller

(57) ABSTRACT

A cooling system includes a cooling plate configured to abut a battery cell. A heat sink is in thermal communication with the cooling plate by at least one carbon fiber brush, the carbon fiber brush coupled to one of the cooling plate and the heat sink and flexible at a free end.

17 Claims, 3 Drawing Sheets

CARBON FIBER THERMAL INTERFACE FOR COOLING MODULE ASSEMBLY

FIELD OF THE INVENTION

The present disclosure relates to a battery pack and more particularly to a cooling system for the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begins with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in the battery pack is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion batteries to militate against the undesirable overheating conditions. Known cooling systems for battery cells are described in Assignee's U.S. Pat. No. 8,383,260 to Essinger et al. issued Feb. 26, 2013 and U.S. Pat. No. 8,435,668 to Kumar et al. issued May 7, 2013, the entire disclosures of which are hereby incorporated herein by reference.

Conventional cooling systems have included cooling plates or fins sandwiched between individual battery cells within the battery pack. The cooling fins are typically joined by "hot" methods such as brazing or welding to a heat sink. Hot joining methods can undesirably affect material microstructure, which can affect joint durability. Known joining methods also typically require filler material such as brazing solders, welding consumables, bonding adhesives, and thermal interface materials, which can undesirably affect thermal conductivity and increase manufacturing complexity.

A further joining method involving heat shrinking is described in Assignee's U.S. Pat. No. 8,771,382 to Heise issued Jul. 8, 2014, the entire disclosure of which is hereby incorporated herein by reference. The method includes the steps providing at least one plate having at least one key, and providing a heat sink having at least one slot formed therein. The heat sink is heated to a first temperature sufficient to thermally expand the heat sink and expand the at least one slot. The at least one key of the at least one plate is then inserted in the at least one slot. The heat sink is then cooled to a second temperature sufficient to thermally contract the heat sink and contract the at least one slot. An interference fit joint securing the at least one plate to the heat sink is thereby formed.

There is a continuing need for a battery cooling system that has a robust mechanical tolerance for assembly, minimizes a manufacturing complexity, and enhances a reliability of the battery cooling system. Desirably, the battery cooling system and method provides a high thermal conductivity, minimizes a need for additional components such as thermal interface material and fin feet, and eliminates a need to design a stiff heat sink for high clamping force between the heat sink and a fin foot of the battery cooling system.

SUMMARY OF THE INVENTION

In concordance with the instant disclosure, a battery cooling system that has a robust mechanical tolerance for assembly, minimizes a manufacturing complexity, enhances reliability, provides a high thermal conductivity, minimizes a need for additional components such as thermal interface material and fin feet, and eliminates a need to design a stiff heat sink for high clamping force between the heat sink and a fin foot of the battery cooling system, is surprisingly discovered.

The carbon fiber thermal interface of the present disclosure provides robust thermal conductivity and also robust mechanical integrity for cooling module assembly applications. Rovings of carbon fibers may be pre-assembled in bundles to form a brush. The brush is coupled to at least one of a cooling plate, also known as a fin, and a heat sink component to provide the thermal interface. Various stacking and attaching methods can be used to couple the cooling plate and the heat sink component with the brushes. The thermal interface may be brush-to-brush or brush-to-surface, as desired. A mechanical flexibility of the bundled carbon fibers permits robust assembly of the cooling plates in a final module stacking operation.

In a first embodiment, a cooling system for a battery cell includes a cooling plate configured to abut the battery cell. A heat sink is in thermal communication with the cooling plate by at least one carbon fiber brush coupled to at least one of the cooling plate and the heat sink.

In another embodiment, a battery pack includes at least one battery cell and a cooling system. The cooling system includes a cooling plate abutting the battery cell and a heat sink. The heat sink is in thermal communication with the cooling plate by at least one carbon fiber brush coupled to at least one of the cooling plate and the heat sink.

In a further embodiment, a propulsion system for an electric vehicle includes a battery pack having at least one battery cell and a cooling system. The cooling system includes a cooling plate abutting the battery cell and a heat sink. The heat sink is in thermal communication with the cooling plate by at least one carbon fiber brush coupled to at least one of the cooling plate and the heat sink.

DRAWINGS

The above, as well as other advantages of the present disclosure, will become readily apparent to those skilled in the art from the following detailed description, particularly when considered in the light of the drawings described herein.

Figure 5:
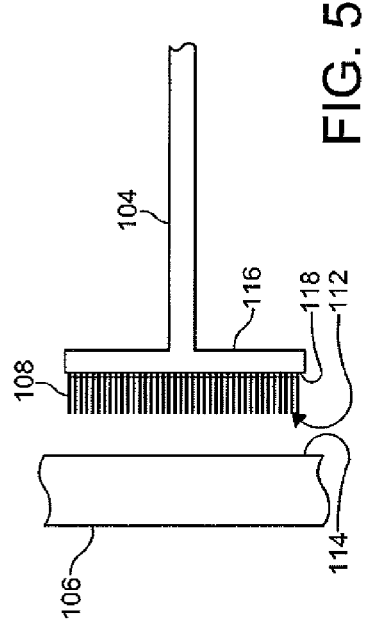
Figure 6:
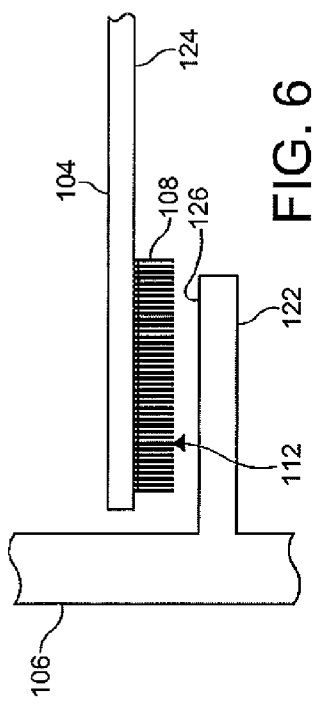
Figure 7:
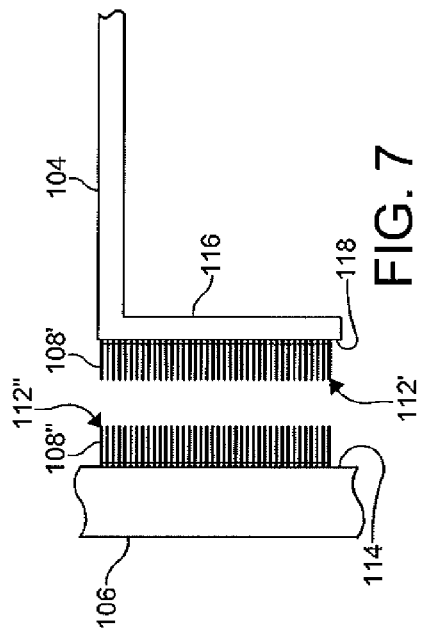
Figure 8:
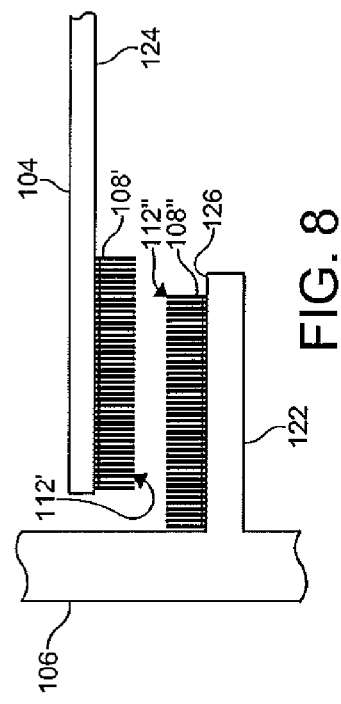
Figure 9:
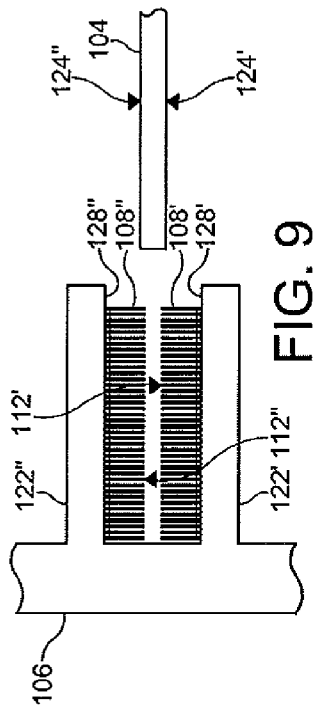
Figure 10:
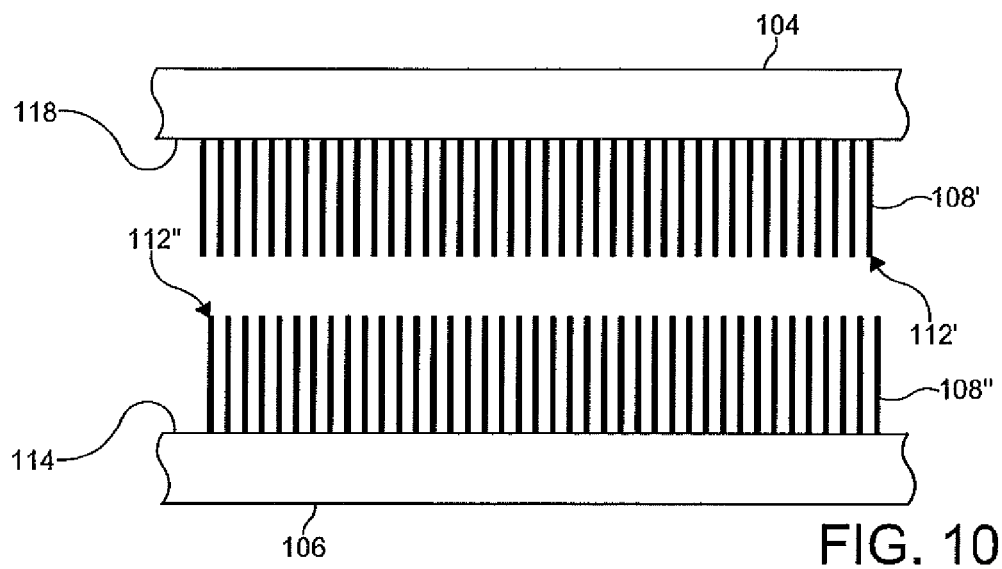
Figure 11:
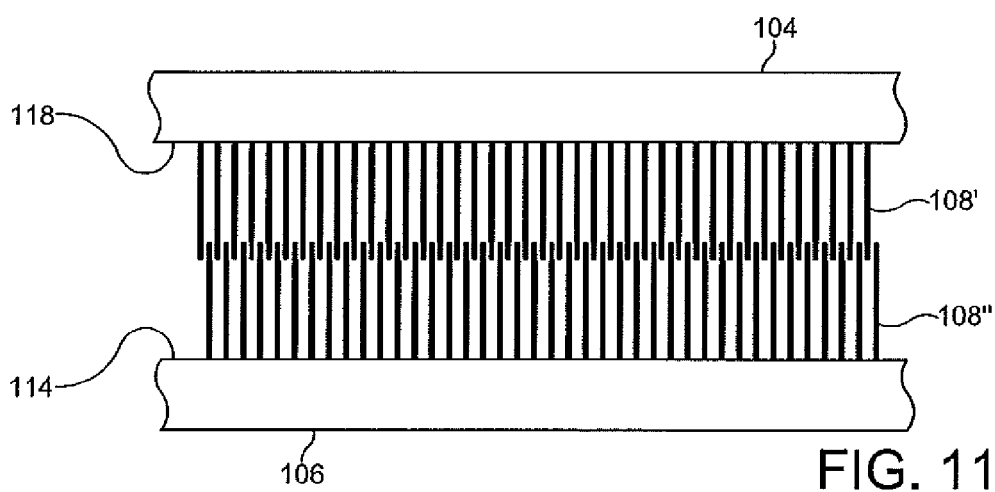
Figure 12:
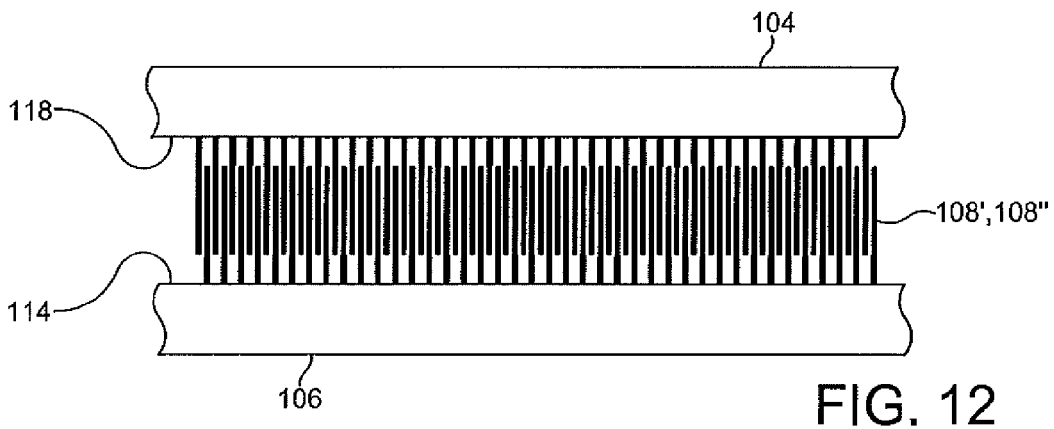

FIGS. 5-9 are enlarged schematic exploded fragmentary top plan views illustrating a cooperating of a cooling plate with a heat sink of a battery cell cooling system according to other embodiments of the present disclosure; and FIG. 10-12 are schematic fragmentary top plan views illustrating a stepwise connecting of a cooling plate with a heat sink of a battery cell cooling system, as depicted in FIGS. 7-8.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

With reference to FIGS. 1-12, a cooling system 100 for a battery cell 102 is illustrated. The battery cell 102 is configured to generate power from an electrochemical reaction. The battery cell 102 may be employed in a battery pack (not shown) for a propulsion system of an electric vehicle (not shown), for example. The battery cell 102 may be a prismatic battery cell, for example, as described and shown in Assignee's Assignee's U.S. Pat. No. 8,771,382 to Heise issued Jul. 8, 2014. As a nonlimiting example, the battery cell 102 is a prismatic lithium ion (Li-ion) pouch cell. It should be appreciated that other types of battery cells 102, employing a different structure and electrochemistry, may also be used within the scope of the present invention.

The cooling system 100 of the present disclosure includes at least one cooling plate 104 and at least one heat sink 106. The cooling plate 104 is configured to abut the battery cell 102. In a particular embodiment, the cooling system 100 includes a plurality of the cooling plates 104 and a plurality of the battery cells 102, the battery cells 102 arranged in a stack, with individual ones of the battery cells 102 sandwiched between pairs of the cooling plates 104. Other arrangements of the battery cells 102 and the cooling plates 104 of the cooling system 100 may also be employed, as desired.

The heat sink 106 of the cooling system 100 is in thermal communication with the cooling plate 104. The heat sink 106 is configured to transfer heat away from the battery cell 102 in operation. In particular, the heat sink 106 is in thermal communication with the cooling plate 104 via at least one carbon fiber brush 108. The carbon fiber brush 108 is coupled to at least one of the cooling plate 104 and the heat sink 106. The carbon fiber brush 108 provides the thermal communication between the cooling plate 104 and the heat sink 106 for transferring heat away from the battery cell 102, through the cooling plate 104, and into the heat sink 106 in operation.

In certain embodiments, the carbon fiber brush 108 includes a bundle of carbon fibers. For example, the at least one carbon fiber brush 108 may be preassembled from a carbon fiber roving, prior to coupling the at least one carbon fiber brush 108 to at least one of the cooling plate 104 and the heat sink 106 during assembly of the cooling system 100. As a nonlimiting example, the carbon fiber roving may be cut into a multitude of bristles of substantially equal length. The bristles are then oriented in substantially a same direction and arranged side-by-side to form the carbon fiber brush 108.

The carbon fiber roving may be woven from a plurality of carbon fiber filaments, for example. In a particular embodiment, the carbon fiber roving is woven from up to about 20,000 carbon fiber filaments. As a nonlimiting example, the carbon fibers of the carbon fiber brush 108 may also be graphitized or otherwise include graphene. Other types of carbon fiber rovings, different configurations, different numbers of filaments, and different chemical compositions, may also be used within the scope of the present disclosure.

It should be understood that each carbon fiber employed in the carbon fiber brush 108 of the present disclosure has a thermal conductivity sufficient to facilitate a conduction of heat from the cooling plate 104 to the heat sink 106. For example, each of the carbon fibers in the at least one carbon fiber brush 108 may have an axial thermal conductivity greater than about 500 W/mK and a radial thermal conductivity from about 5 W/mK to about 40 W/mK. Similarly, the carbon fibers employed in the carbon fiber brush 108 have a strength and a mechanical flexibility that permits a robust and flexible connection between the cooling plate 104 and the heat sink 106. For example, each carbon fiber in the at least one carbon fiber brush 108 may have a tensile strength from about 2.4 Gpa to about 7 Gpa, and an elastic modulus from about 230 Gpa to about 700 Gpa. A skilled artisan may use carbon fibers having different thermal conductivities, tensile strengths, and elastic modulii, as desired.

The at least one carbon fiber brush 108 may be coupled to at least one of the cooling plate 104 and the heat sink 106 by any suitable means. In an illustrative embodiment, the at least one carbon fiber brush 108 is coupled to at least one of the cooling plate 104 and the heat sink 106 with a thermally conductive adhesive. In another embodiment, the at least one carbon fiber brush 108 is coupled to at least one of the cooling plate 104 and the heat sink 106 with a clamp. In a further embodiment, at least one of the cooling plate 104 and the heat sink 106 has a channel (not shown) into which a secured end of the at least one carbon fiber brush 108 is disposed. The channel may be substantially C-shaped, for example, and have the thermally conductive adhesive disposed therein together with the secured end of the at least one carbon fiber brush 108. The channel may be used in combination with other securing means to hold the at least one brush 108 onto at least one of the cooling plate 104 and the heat sink 106. Other means for coupling the at least one carbon fiber brush 108 to at least one of the cooling plate 104 and the heat sink 106 may also be employed, as desired.

Figure 1:
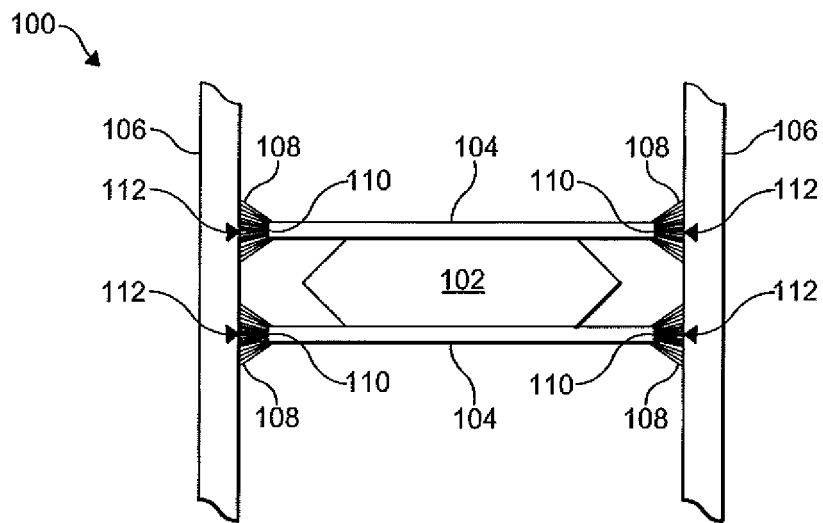
FIG. 1 is a schematic fragmentary top plan view illustrating a battery cell cooling system according to one embodiment of the present disclosure.
Figure 2:
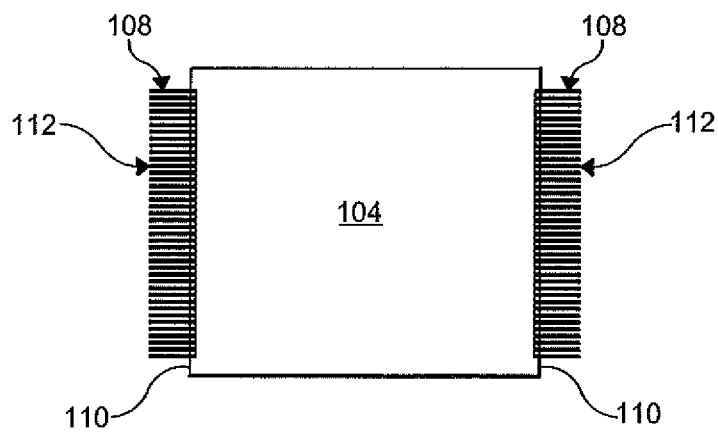
FIG. 2 is a schematic side elevational view of a cooling plate of the battery cell cooling system illustrated in FIG. 1.

Referring now to FIGS. 1 and 2, the cooling system 100 according to one embodiment of the disclosure is shown, where the least one carbon fiber brush 108 is coupled to an end portion 110 of the cooling plate 104. The at least one carbon fiber brush 108 has a free end 112. The free end 112 of the at least one carbon fiber brush 108 abuts the heat sink 106, for example, as illustrated in FIG. 1.

Figure 3:
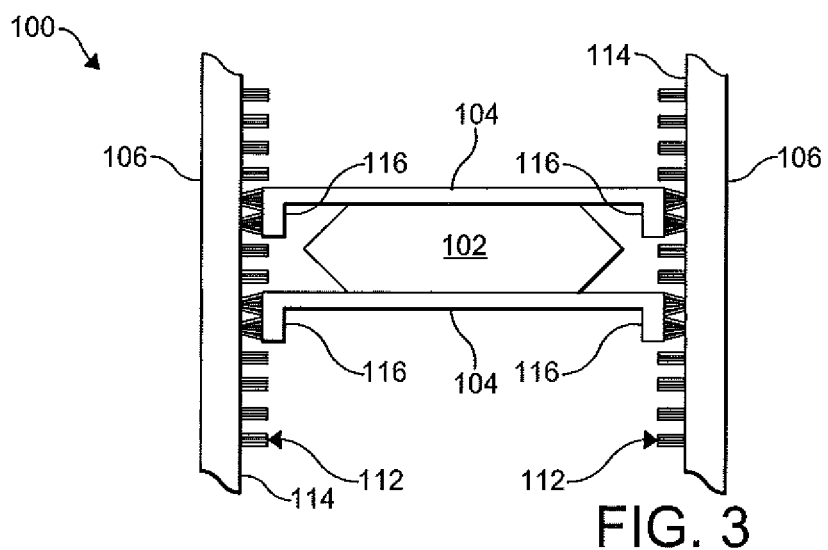
FIG. 3 is a schematic fragmentary top plan view illustrating a battery cell cooling system according to another embodiment of the present disclosure.
Figure 4:
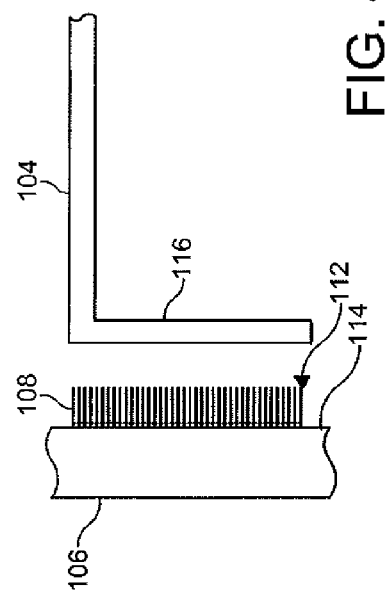
FIG. 4 is an enlarged schematic exploded fragmentary top plan view of the battery cell cooling system illustrated in FIG. 3.

With reference to FIGS. 3 and 4, the at least one carbon fiber brush 108 may be coupled to a side surface 114 of the heat sink 106. For example, the at least one carbon fiber brush 108 has the free end 112 that abuts the cooling plate 104. In particular, where the at least one carbon fiber brush 108 is coupled to the surface 114 of the heat sink, the cooling plate 108 may be provide with an angled end portion 116. The angled end portion 116 provides greater surface area for contacting the at least one carbon fiber brush 108, and an edge of the cooling plate 108 would provide alone. As a nonlimiting example, as shown in FIGS. 3 and 4, the angle end portion 116 may be substantially L-shaped. The free end 112 of the carbon fiber brush 108 may abut the angled end portion 116 of the cooling plate 108, and thereby transfer heat from the cooling plate 104 to the heat sink 106 during operation of the battery cell 102.

In another embodiment, shown in FIG. 5, the angled end portion 116 of the cooling plate 108 may be substantially T-shaped. Where the angled end portion 116 is substantially T-shaped, an end surface 118 of the cooling plate 104 may be oriented substantially parallel with the side surface 114 of the heat sink 106. During an operation of the cooling system 100, the carbon fiber brush 108 abuts the side surface 114 of the heat sink 106, and provides thermal communication between the cooling plate 104 and the heat sink 106 to regulate a temperature of the battery cell 102.

Referring now to FIG. 6, a further embodiment is shown where the heat sink 106 has an outwardly extending portion 122. The at least one carbon fiber brush 108 is coupled to a side surface 124 of the cooling plate 104. The free end 112 of the at least one carbon fiber brush 108 abuts a side surface 126 of the outwardly extending portion 122 of the heat sink 106. The side surface 124 of the cooling plate 104 may be oriented substantially parallel with the side surface 126 of the outwardly extending portion 122 of the heat sink 106. Thermal communication between the cooling plate 104 and the heat sink 106 is thereby provided.

With renewed reference to FIGS. 7-12, it should be appreciated that the at least one carbon fiber brush 108 of the disclosure may include more than one carbon fiber brush 108. Like or related structure from FIGS. 1-5 that are shown in FIGS. 7-12 are identified with a same reference numeral and a prime (') symbol or a double-prime (") symbol, for the purpose of clarity.

As shown in FIG. 7, the cooling system 100 may include a first carbon fiber brush 108' coupled to the end surface 118 of the angled end portion 116 of the cooling plate 104. A second carbon fiber brush 108" may be coupled to the side surface 114 of the heat sink 106. The end surface 118 of the angled end portion 116 of the cooling plate 104 is oriented substantially parallel with the side surface 114 of the heat sink 106. Upon assembly of the cooling system 100, the first carbon fiber brush 108' is interspersed with the second carbon fiber brush 108" to provide sufficient thermal communication therebetween.

A stepwise assembly and cooperation of the first carbon fiber brush 108' with the second carbon fiber brush 108" is illustrated in FIGS. 10-12. The cooperation results in an interspersion or "sticking together" of the first carbon fiber brush 108' with the second carbon fiber brush 108", which provides a sufficiently large contact surface between the carbon fibers of the respective first and second carbon fiber brushes 108', 108", in order to assure desirable thermal transfer both radially and axially through the carbon fibers.

With reference to FIG. 8, the side surface 126 of the outwardly extending portion 122 of the heat sink 106 may have the second carbon fiber brush 108" coupled thereto. The first carbon fiber brush 108' may be coupled to the side surface 124 of the cooling plate 104. As in the embodiment shown in FIG. 8, the side surface 126 of the outwardly extending portion 122 may be substantially parallel with the side surface 124 of the cooling plate 104. The first carbon fiber brush 108' and the second carbon fiber brush 108" are pressed together and cooperate upon assembly of the cooling system 100.

FIG. 9 shows a further embodiment of the present disclosure, where the heat sink 106 includes a pair of spaced apart outwardly extending portions 122', 122" and a pair of carbon fiber brushes 108', 108". One of the pair of carbon fiber brushes 108', 108" is respectively disposed on an inner surface 128', 128" of each of the outwardly extending portions 122', 122". Upon assembly of the cooling system 100, the free ends 112', 112" of the carbon fiber brushes 108', 108" abut opposing side surfaces 124', 124" of the cooling plate 104.

Advantageously, the cooling system 100 for the battery cell 102 of the present disclosure is tolerance robust, as the free end 112, 112', 112" of the at least one carbon fiber brush 108, 108', 108" flexibly contacts at least one of the cooling plate 104, the heat sink 106, and another one of the at least one carbon fiber brush 108, 108', 108" to form a path for transfer of heat between the battery cell 102 and the heat sink 106. Due to the flexibility of the at least one carbon fiber brush 108, 108', 108", a need to manufacture the cooling plate 104 and the heat sink 106 to fine tolerances is militated against.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling system for a battery cell, comprising:
a cooling plate configured to abut the battery cell; and
a heat sink in thermal communication with the cooling plate by at least one carbon fiber brush, the at least one carbon fiber brush coupled to one of the cooling plate and the heat sink and flexible at a free end to allow the free end of the at least one carbon fiber brush to maintain thermal communication between the cooling plate and the heat sink while allowing for differences in construction tolerance related to a spacing difference between the cooling plate and the heat sink to be accommodated by flexure of the at least one carbon fiber brush at the free end; wherein the at least one carbon fiber brush includes a bundle of carbon fibers, and wherein each carbon fiber in the carbon fiber brush includes graphene.

2. The cooling system of claim 1, wherein the at least one carbon fiber brush is preassembled from a carbon fiber roving.

3. The cooling system of claim 2, wherein the at least one carbon fiber roving is woven from a plurality of carbon fiber filaments.

4. The cooling system of claim 3, wherein the carbon fiber roving is woven from up to about 20,000 carbon fiber filaments.

5. The cooling system of claim 1, wherein each carbon fiber in the at least one carbon fiber brush has an axial thermal conductivity greater than about 500 W/mK, a radial thermal conductivity from about 5 W/mK to about 40 W/mK, a tensile strength from about 2.4 Gpa to about 7 Gpa, and an elastic modulus from about 230 Gpa to about 700 Gpa.

6. The cooling system of claim 1, wherein the at least one carbon fiber brush is coupled to the one of the cooling plate and the heat sink with a thermally conductive adhesive.

7. The cooling system of claim 1, wherein the at least one carbon fiber brush is coupled to the one of the cooling plate and the heat sink with a clamp.

8. The cooling system of claim 1, wherein the at least one carbon fiber brush is coupled to an end portion of the cooling plate and the free end abuts the heat sink.

9. The cooling system of claim 1, wherein the at least one carbon fiber brush is coupled to a surface of the heat sink and has a free end abutting the cooling plate.

10. The cooling system of claim 9, wherein the cooling plate has an angled end portion, the free end of the carbon fiber brush abutting the angled end portion of the cooling plate.

11. The cooling system of claim 10, wherein the angled end portion is substantially L-shaped.

12. The cooling system of claim 1, wherein the at least one carbon fiber brush includes a first carbon fiber brush coupled to the cooling plate and a second carbon fiber brush coupled to the heat sink, the first carbon fiber brush interspersed with the second carbon fiber brush to provide thermal communication therebetween.

13. The cooling system of claim 12, wherein the first carbon fiber brush is coupled to an end surface of the cooling plate and the second carbon fiber brush is coupled to a side surface of the heat sink, the end surface of the cooling plate oriented substantially parallel with the side surface of the heat sink.

14. The cooling system of claim 12, wherein the first carbon fiber brush is coupled to a side surface of the cooling plate and the second carbon fiber brush is coupled to a side surface of an outwardly extending portion of the heat sink, the side surface of the cooling plate oriented substantially parallel with the side surface of the outwardly extending portion of the heat sink.

15. The cooling system of claim 1, wherein the heat sink has an outwardly extending portion and the at least one carbon fiber brush is coupled to a side surface of the cooling plate, the at least one carbon fiber brush having a free end abutting a surface of the outwardly extending portion of the heat sink.

16. The cooling system of claim 1, wherein the heat sink has a pair of spaced apart outwardly extending portions and the at least one carbon fiber brush includes a pair of carbon fiber brushes, each of the pair of carbon fiber brushes having a free end, one of the pair of carbon fiber brushes disposed on an inner surface of each of the outwardly extending portions, the free ends of the pair of carbon fiber brushes abutting opposing side surfaces of the cooling plate.

17. A cooling system for a battery cell, comprising:

a cooling plate configured to abut the battery cell; and a heat sink in thermal communication with the cooling plate by a carbon fiber brush, wherein multiple brush fibers of the carbon fiber brush are fixed to the cooling plate and flexible at a free end positioned proximate to the heat sink to allow the free end of the carbon fiber brush to maintain thermal communication between the cooling plate and the heat sink while allowing for differences in construction tolerance related to a spacing difference between the cooling plate and the heat sink to be accommodated by flexure of the carbon fiber brush at the free end; wherein the at least one carbon fiber brush includes a bundle of carbon fibers, and wherein each carbon fiber in the carbon fiber brush includes graphene.

\* \* \* \* \*